United States Patent
Sharma et al.

(10) Patent No.: US 11,373,175 B2
(45) Date of Patent: Jun. 28, 2022

(54) METHOD AND SYSTEM FOR LINKAGE OF BLOCKCHAIN PRIVATE KEYS

(71) Applicant: MASTERCARD INTERNATIONAL INCORPORATED, Purchase, NY (US)

(72) Inventors: Madhavi Sharma, Haryana (IN); Chandan Garg, Punjab (IN); Jaipal Singh Kumawat, Rajasthan (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 200 days.

(21) Appl. No.: 16/282,522

(22) Filed: Feb. 22, 2019

(65) Prior Publication Data

US 2020/0273025 A1  Aug. 27, 2020

(51) Int. Cl.
*G06Q 20/38* (2012.01)
*G06Q 20/36* (2012.01)
*H04L 9/06* (2006.01)

(52) U.S. Cl.
CPC ..... *G06Q 20/3825* (2013.01); *G06Q 20/3674* (2013.01); *H04L 9/0637* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| 2015/0120539 A1* | 4/2015 | Amancherla | G06Q 20/3676 705/41 |
| 2017/0046651 A1* | 2/2017 | Lin | H04L 63/061 |
| 2017/0046698 A1* | 2/2017 | Haldenby | H04L 9/0861 |

(Continued)

FOREIGN PATENT DOCUMENTS

WO  WO-2016204572 A2 * 12/2016  ............. G06F 21/31

OTHER PUBLICATIONS

Jolana Kubicek, "Complications of Cryptocurrency: Financial and Cybersecurity Risk in the Age of Bitcoin", Apr. 2018, Utica College, pp. 1-78 (Year: 2018).*

*Primary Examiner* — Neha Patel
*Assistant Examiner* — Clay C Lee
(74) *Attorney, Agent, or Firm* — Buchanan Ingersoll & Rooney PC

(57) ABSTRACT

A method for processing redundant blockchain transactions for linked wallets includes: storing blockchain data associated with a blockchain including a plurality of blocks, each block including a block header and blockchain data values, each data value corresponding to a processed blockchain transaction; receiving a new blockchain data value including an input transaction, recipient address, and transaction amount; confirming each input transaction based on a corresponding blockchain data value; identifying a plurality of blockchain wallets linked to the recipient address, and, for each wallet, an additional recipient address; generating a mirror blockchain data value for each linked wallet including the input transaction, transaction amount, and the additional recipient address identified for the respective linked wallet; and transmitting the new blockchain data value and each mirror blockchain data value to one or more nodes in a blockchain network associated with the blockchain.

18 Claims, 5 Drawing Sheets

(56) References Cited

U.S. PATENT DOCUMENTS

2018/0096175 A1* 4/2018 Schmeling ............. G06Q 10/08
2018/0268401 A1* 9/2018 Ortiz ...................... G06Q 20/36
2018/0331832 A1* 11/2018 Pulsifer ................. H04L 9/0637
2019/0205844 A1* 7/2019 Nuzzi ................ G06Q 20/3829

* cited by examiner

METHOD AND SYSTEM FOR LINKAGE OF BLOCKCHAIN PRIVATE KEYS

FIELD

The present disclosure relates to the processing of redundant blockchain transactions for linked wallets, specifically the linking of blockchain wallets through the use of redundant transactions that forego confirmation to ensure provenance of data ownership and control even through loss of a blockchain wallet.

BACKGROUND

Blockchains have a large number of benefits as a data storage mechanism. One of the more notable aspects of a blockchain is that it is immutable; data stored in a blockchain cannot be changed without modification to every subsequent block in the chain, making the chain extremely resistant to change and, due to limitations on computing power and network transmission, often impossible. One of the other aspects of blockchain that is often a benefit is anonymity, as blockchain interactions are typically done through a blockchain wallet, where the owner of the wallet can remain anonymous.

However, the anonymity can sometimes become a problem for a wallet owner. In standard blockchains, data is attributed to a specific blockchain wallet, where ownership of the blockchain wallet, typically demonstrated through the use of a digital signature and cryptographic key pairs, must be shown in order to prove ownership of associated data. For example, in a blockchain used for tracking ownership of land deeds, an entity must prove ownership of the blockchain wallet associated with a land deed in the blockchain to prove ownership of the corresponding land. In another example, in a blockchain used for cryptographic currency, ownership of a blockchain wallet must be proven for use of the cryptographic currency transferred to that wallet. Because ownership is tied to the cryptographic key pairs, loss of a private key will typically result in loss of the blockchain wallet. As a result, if a private key is lost, an entity may no longer be able to prove ownership of a land deed or may lose access to a large amount of cryptographic currency. Because of the anonymity of blockchains, an entity that loses their private key may be unable to recover the private key, and thus the land deed or cryptographic currency may be lost forever.

Some methods have been used to assist users with safekeeping of their private keys. For instance, some entities operate repositories that will store a copy of a user's private key for safekeeping, where the user can authenticate themselves with the repository through alternative means. However, repositories have been repeatedly hacked and private keys stored therein compromised. In other cases, a user may make several copies of their private key and have it stored across multiple devices, so loss of one device may not preclude loss of the wallet. However, theft of one of the devices still leads to compromise of the entire wallet, where a thief can quickly transfer all data associated with that blockchain wallet to their own blockchain wallet. Thus, existing methods for assisting users with safekeeping of their private keys are often unsuccessful.

Thus, there is a need for an improved system for linking blockchain wallets to prevent loss of associated data upon loss of a private key.

SUMMARY

The present disclosure provides a description of systems and methods for processing redundant blockchain transactions for linked wallets. A user of a blockchain network may create a plurality of different blockchain wallets. These blockchain wallets can be linked together through a series of small transactions where the user proves ownership of each blockchain wallet, with the linkage being stored in a sidechain or other database accessible by nodes in the blockchain network. When the user wants to conduct a transaction, they can do so using any of their blockchain wallets. The node that assists in processing of the transaction will confirm the transaction with the blockchain wallet that was used, but may then generate redundant transactions for every other blockchain wallet linked thereto. Each of these redundant transactions may also be posted to the blockchain along with the initial transaction, but where redundant transactions may not be confirmed, as confirmation would fail due to multiple instances of a transaction input being used. As such, nodes in the blockchain network may be specially configured to utilize linked blockchain wallets, enabling redundant transactions to be added to new blocks without explicit confirmation thereof. The result is that a user may lose a blockchain wallet, but still able to retain ownership of associated data through use of the other linked wallets. Even in cases where a blockchain wallet may be stolen, the user may easily unlink one wallet through illustrated ownership of other, linked wallets.

A method for processing redundant blockchain transactions for linked wallets includes: storing, in a memory of a processing server, blockchain data related to a blockchain including at least a plurality of blocks, where each block includes a block header and one or more blockchain data values, each blockchain data value corresponds to a processed blockchain transaction; receiving, by a receiver of a processing server, a new blockchain data value, where the new blockchain data value includes at least one input transaction, a recipient address, and a transaction amount; confirming, by a processing device of the processing server, each of the at least one input transactions based on blockchain data values included in the plurality of blocks that include the respective input transaction; identifying, by a processing device of the processing server, a plurality of blockchain wallets linked to the recipient address, and, for each of the plurality of blockchain wallets, an additional recipient address; generating, by the processing device of the processing server, a mirror blockchain data value for each of the plurality of blockchain wallets, where the mirror blockchain data value includes the at least one input transaction, the transaction amount, and the additional recipient address identified for the respective blockchain wallet; and transmitting, by a transmitter of the processing server, the new blockchain data value and the generated mirror blockchain data value for each of the plurality of blockchain wallets to one or more nodes in a blockchain network associated with the blockchain.

A system for processing redundant blockchain transactions for linked wallets includes: a memory of a processing server configured to store blockchain data related to a blockchain including at least a plurality of blocks, where each block includes a block header and one or more blockchain data values, each blockchain data value corresponds to a processed blockchain transaction; a receiver of a processing server configured to receive a new blockchain data value, where the new blockchain data value includes at least one input transaction, a recipient address, and a transaction amount; a processing device of the processing server configured to confirm each of the at least one input transactions based on blockchain data values included in the plurality of blocks that include the respective input transaction, identify a plurality of blockchain wallets linked to the recipient address, and, for each of the plurality of blockchain wallets, an additional recipient address, and generate a mirror blockchain data value for each of the plurality of blockchain wallets, where the mirror blockchain data value includes the at least one input transaction, the transaction amount, and the additional recipient address identified for the respective blockchain wallet; and a transmitter of the processing server configured to transmit the new blockchain data value and the generated mirror blockchain data value for each of the plurality of blockchain wallets to one or more nodes in a blockchain network associated with the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A shared ledger of all transactions of a blockchain-based digital asset, such as a cryptographic currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and an asset amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Processing Redundant Blockchain Transactions for Linked Wallets

Figure 1:
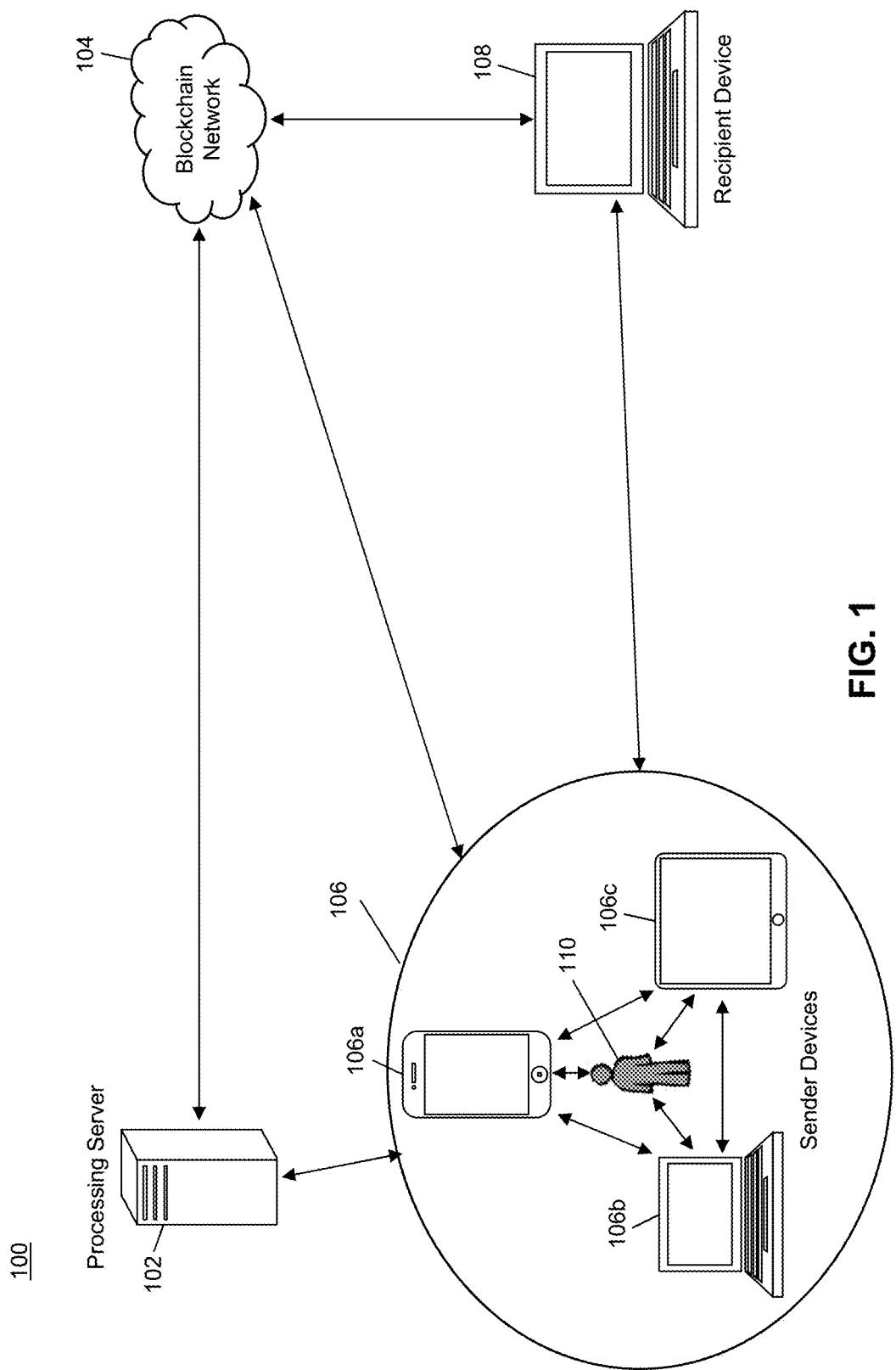
FIG. 1 is a block diagram illustrating a high level system architecture for processing redundant blockchain transactions in accordance with exemplary embodiments.

FIG. 1 illustrates a system 100 for the processing of redundant blockchain transactions on a blockchain to enable linked blockchain wallet.

The system 100 may include a processing server 102. The processing server 102, discussed in more detail below, may be configured to process redundant transactions for a blockchain associated with a blockchain network 104, where redundant transactions may mirror an initial transaction but, utilizing linked blockchain wallets and where such transactions may not be confirmed prior to being added to the blockchain. As discussed herein, a blockchain "transaction" may refer to any data added to the blockchain that is associated with a sending blockchain wallet and a receiving blockchain wallet. For instance, in a first example, a blockchain transaction may be a transfer of ownership of a land deed from one entity (e.g., the sending blockchain wallet) to another (e.g., the receiving blockchain wallet). In a second example, a blockchain transaction may be a vote being cast for a person running for an elected office, where the sending blockchain wallet casts the vote for the receiving blockchain wallet. In a third example, the blockchain transaction may be a transfer of cryptographic currency from the sender to the receiver.

The blockchain network 104 may be comprised of a plurality of nodes. Each node may be a computing system that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. In an exemplary embodiment, each node may be a processing server 102 configured to perform the functions of the processing server 102 as discussed herein. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 104 prior to the generation and addition of a new block to the blockchain in order for the change to be made permanent. Computational and communication limitations may make such a modification exceedingly difficult, if not impossible, thus rendering the blockchain immutable.

The blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device that stores the private key for use thereof in blockchain transactions. For instance, in the system 100 a blockchain transaction may take place between a sender device 106 having a sending blockchain wallet and a recipient device 108 having a receiving blockchain wallet, where "sender device 106" and "recipient device 108" may additionally refer to the blockchain wallets stored on the respective devices. The sender device 106 and recipient device 108 may be any type of computing device suitable for performing the functions discussed herein, such as a specially configured desktop computer, laptop computer, notebook computer, tablet computer, cellular phone, smart phone, smart watch, smart television, wearable computing device, etc.

Each blockchain data value stored in the blockchain may correspond to a blockchain transaction. A blockchain transaction may consist of at least: a digital signature of the sender generated using the sender's private key, a blockchain address of the recipient of currency generated using the recipient's public key, and the data being stored, such as the land deed being transferred, vote being cast, cryptographic currency being transferred, etc. In some blockchain transactions, the transaction may also include one or more blockchain addresses of the sender where data was previously associated and is thereby currently stored (e.g., where the digital signature proves their access to such data), as well as an address generated using the sender's public key for any information that is to be retained by the sender (e.g., change in a cryptocurrency transaction). Addresses to which data has been sent that can be used in future transactions are referred to as "output" addresses, as each address was previously used to capture output of a prior blockchain transaction, also referred to as "unspent transactions," due to there being data being transferred to the address in a prior transaction where that data still remains. In some cases, a blockchain transaction may also include the sender's public key, for use by an entity in validating the transaction. For the processing of a blockchain transaction, such data may be provided to a node in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), and then include the blockchain transaction in a new block. The new block may be validated by other nodes in the blockchain network 104 before being added to the blockchain and distributed to all of the nodes in the blockchain network 104.

In the system 100, a user 110, such as associated with a sender device 106 may have a desire to link multiple blockchain wallets together to mitigate the risk of loss of a blockchain wallet resulting in loss of the associated data. The user may have multiple blockchain wallets stored on the sender device 106 (e.g., via the storage of multiple private keys of cryptographic key pairs) and/or may possess multiple sender devices 106 (such as illustrated in FIG. 1 as sender devices 106a, 106b, and 106c), where each sender device 106 may have a blockchain wallet stored therein. To link blockchain wallets, the user 110 may prove ownership of each blockchain wallet with the processing server 102 (e.g., or other node in the blockchain network 104). Proof of ownership may be accomplished via the transmission of a message to the processing server 102 that includes a digital signature generated using the private key of each blockchain wallet. In some cases, the message may be a transaction that is conducted by the user 110 using each of the blockchain wallets they want to link together. For example, in a cryptographic currency blockchain, the user 110 may conduct a series of small cryptocurrency transfers to and from their various wallets on the blockchain to illustrate ownership of each blockchain wallet.

The processing server 102 may store data regarding the linked blockchain wallets. In some embodiments, the processing server 102 may store such data locally, such as storing a plurality of linked wallet pairs, where each wallet pair includes two or more blockchain wallets that have been linked together. Data stored therein may include the public key for each blockchain wallet, an identification value, or other suitable identifying information. In some cases, a unique identifier may be assigned to each group of linked blockchain wallets, where such unique identifier may be used by the associated user 110 when interacting with the processing server 102 for convenience. In such cases, a linked wallet pair may include such a value. In other embodiments, data regarding the linking of blockchain wallets may be stored in a sidechain. A sidechain may be a separate blockchain from the parent blockchain, but may be linked via some form of two-way connection thereto. In the system 100, a sidechain may be used to store linkage transactions or blockchain data values regarding linked blockchain wallet pairs, where the addresses may correspond to addresses and wallets used in the parent blockchain, but without affecting the data types stored in the parent blockchain. In such embodiments, each time a set of linked wallet pairs is modified, a new blockchain data value may be added to the sidechain that updates the set of linked wallet pairs, where the processing server 102 may always consider the most recent update of linked wallet pairs for a blockchain wallet when a new transaction is submitted.

In order to use a blockchain wallet that is linked to other wallets, the user 110 may submit a transaction to the processing server 102 or other node in the blockchain network 104 using any of the linked blockchain wallets. The transaction may include at least an input transaction (e.g., the unspent transaction output from a prior transaction that is being used by the sender), a recipient address, and a transaction amount or other data that is to be stored in the subsequent blockchain data value (e.g., vote to be cast, land deed being transferred, cryptographic currency amount being transferred, etc.). In some cases, the transaction may also include a public key of the cryptographic key pair of the blockchain wallet being used in the transaction. Once the transaction has been received, the processing server 102 may confirm the transaction. Confirmation of the transaction may include validating the transaction input and the transaction amount or other data being stored in the subsequent blockchain data value. For example, the transaction may be accompanied by a digital signature generated by the sender's private key for the blockchain wallet being used, where the processing server 102 may validate the digital signature as being associated with the input transaction using a private key of the cryptographic key pair (e.g., which may be stored in the blockchain data value for the input transaction), and may ensure that there is suitable cryptographic currency or any other criteria is met for the transfer to occur as part of the confirmation of the transaction.

Once the transaction is confirmed, the processing server 102 may determine if the blockchain wallet being used is linked to other blockchain wallets. The determination may be based on an additional data value included in the transaction, a search of the linked wallet pairs stored in the processing server 102 or a sidechain for the blockchain wallet used in the transaction, other indication provided by the sender, etc. If the wallet is not linked to any other wallets, the transaction may be included in a new blockchain data value that is included in a new block and added to the blockchain using traditional methods. In either case, the processing server 102 may generate a blockchain data value properly formatted for the blockchain that includes the necessary transaction data, such as the input transaction, recipient address, transaction amount or other information, and the public key.

If the blockchain wallet is linked to one or more other blockchain wallets, the processing server 102 may identify each of the linked wallets using the plurality of linked wallet pairs. The processing server 102 may then generate an additional, redundant blockchain data value for each linked blockchain wallet. In each redundant blockchain data value, the public key and digital signature may be replaced by the public key for the cryptographic key pair of the respective, linked blockchain wallet. In cases where the recipient blockchain wallet, identified via the recipient address, may be linked to other blockchain wallets (e.g., determined in the same manner as the sending blockchain wallet), additional redundant transactions may be generated for each linked, sending blockchain wallet that has a different recipient address for each linked, recipient blockchain wallet (e.g., generated using that wallet's respective public key). For instance, if the sender has wallets A, B, and C all linked together, and the recipient has wallets X, Y, and Z linked together, the processing server 102 may generate the initial blockchain data value for transfer from wallet A to X, as well as redundant blockchain data values for transfers from wallet A to Y and Z, wallet B to X, Y, and Z, and wallet C to X, Y, and Z.

Once all of the blockchain data values have been generated, the blockchain data values may be included in a new block either generated directly by the processing server 102, or by another node in the blockchain network 104, where the processing server 102 may transmit all of the blockchain data values to the node. In an exemplary embodiment, none of the redundant blockchain data values may be confirmed by any node in the blockchain network 104. Because each of the redundant blockchain data values may be attempting to use an input transaction that was already used, either to send or receive data in the blockchain, confirmation of such a transaction would fail. Accordingly, the nodes in the blockchain network 104 may be configured to refrain from attempting to confirm redundant blockchain data values, or may ignore failed confirmations for redundant blockchain data values. In some cases, a blockchain data value may have a flag included therein indicating to a node that the blockchain data value is a redundant blockchain data value. In some instances, a redundant blockchain data value may include an identification value that links it to the original blockchain data value. For example, a unique identifier may be included in all blockchain data values that are related to a single transaction.

Once a node has generated a new block that includes each of the blockchain data values, using traditional methods and systems, the node may transmit the new block to a plurality of other nodes in the blockchain network 104. The other nodes may confirm the new block and may provide their approval to the generating node and/or some of the other nodes, and the new block may be added to the blockchain and distributed to all of the nodes in the blockchain network 104. The receiver may then have access to the appropriate data with any of their linked blockchain wallets, and all of the sender's blockchain wallets may be unable to use the transferred data. The result is that if the sender or receiver loses one private key, they may still conduct transactions using any of the other private keys that are linked thereto.

In cases where a user loses a private key, they may wish to unlink the private key from the rest of their blockchain wallets. In some cases, the user may be required to simply submit a request to the processing server 102 that proves ownership of one of the blockchain wallets linked thereto, such as through a digital signature. In some instances, the processing server 102 may require ownership of a minimum number of linked blockchain wallets to be shown, which, in some cases, may include a majority of the linked blockchain wallets. For instance, requiring multiple wallets may prevent a thief that steals possession of one blockchain wallet from unlinking the other blockchain wallets.

Processing Server

Figure 2:
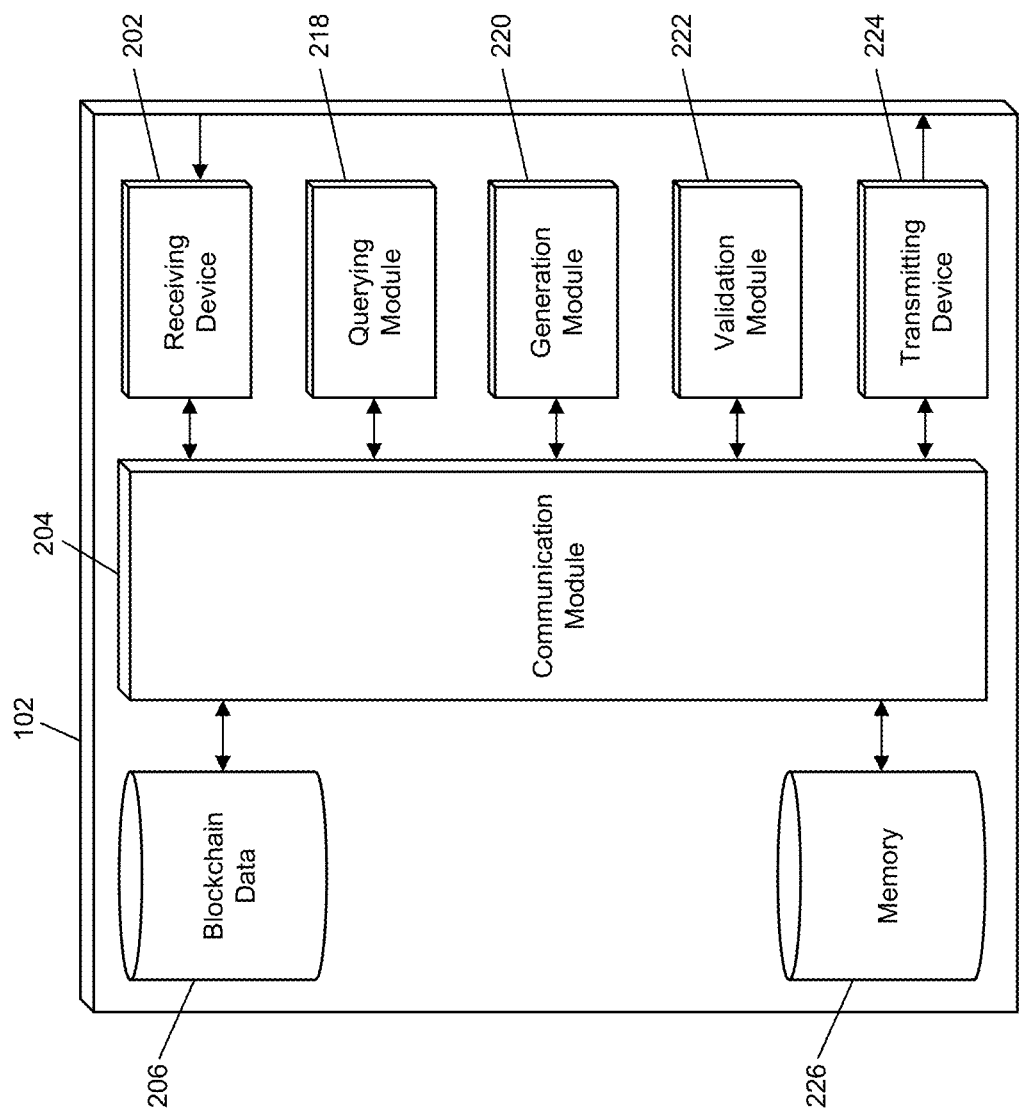
FIG. 2 is a block diagram illustrating the processing server of the system of FIG. 1 for processing redundant blockchain transactions in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. In some cases, each node in the blockchain network 104 may be configured similar to the processing server 102 in FIG. 2 or computer system 500 in FIG. 5, such as including the components illustrated therein.

The processing server 102 may include a receiving device 202. The receiving device 202 may be configured to receive data over one or more networks via one or more network protocols. In some instances, the receiving device 202 may be configured to receive data from sender devices 106, recipient devices 108, other blockchain nodes, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by sender devices 106 and/or recipient devices 108 that are superimposed or otherwise encoded with blockchain transactions for linking wallets, information for removal of linked wallets, and new blockchain transactions to be added to the blockchain. The receiving device 202 may also be configured to receive data signals electronically transmitted by other nodes in the blockchain network 104 that are superimposed or otherwise encoded with new blockchain data values and/or blocks for confirmation and/or addition to the blockchain.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include blockchain data 206. The blockchain data 206 may include one or more blockchains, such as a primary blockchain and any sidechains. A blockchain may be comprised of a plurality of blocks, where each block includes at least a block header and one or more blockchain data values. In some cases, the blockchain data 206 may further include a plurality of linked wallet pairs or a sidechain that includes blockchain data values that are used to store linked wallet pairs. The blockchain data 206 may further include any data used by the processing server 102 in performing the functions related to the blockchain, such as signature generation algorithms, address generation algorithms, communication addresses for blockchain nodes, etc.

The processing server 102 may include a querying module 218. The querying module 218 may be configured to execute queries on databases to identify information. The querying module 218 may receive one or more data values or query strings, and may execute a query string based thereon on an indicated database, such as the blockchain data 206 of the processing server 102 to identify information stored therein. The querying module 218 may then output the identified information to an appropriate engine or module of the processing server 102 as necessary. The querying module 218 may, for example, execute a query on the blockchain data 206 to identify all blockchain wallets linked to a wallet used in a new, submitted blockchain transaction.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate new blockchain data values for redundant blockchain transactions, and to generate new blocks that include new blockchain data values. The generation module 220 may also be configured to generate new blockchain addresses in cases where a recipient of a new blockchain transaction may have linked blockchain wallets.

The processing server 102 may also include a validation module 222. The validation module 222 may be configured to perform validations and verifications for the processing server 102 as part of the functions discussed herein. The validation module 222 may receive instructions as input, which may include data to be validated and/or data to be used in the validation. The validation module 222 may perform a validation or verification as requested, and may output a result of the validation to another module or engine of the processing server 102. The validation module 222 may, for example, be configured to validate digital signatures using public keys and validate ownership of blockchain wallets using digital signatures and/or other data for use in managing linked blockchain wallets.

The processing server 102 may also include a transmitting device 224. The transmitting device 224 may be configured to transmit data over one or more networks via one or more network protocols. In some instances, the transmitting device 224 may be configured to transmit data to other nodes in the blockchain network 104 and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to other nodes in the blockchain network 104 that are superimposed or otherwise encoded with new blockchain data values for confirmation and/or addition to the blockchain, or with new blocks for confirmation and addition to the blockchain. In some embodiments, the transmitting device 224 may be configured to electronically transmit data signals to sender devices 106 and recipient devices 108, which may be superimposed or otherwise encoded with notifications regarding linkage of blockchain wallets and processing of redundant blockchain transactions.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, hashing algorithms for generating blocks, credentials for validation, usage rule templates, communication data for blockchain nodes, communication data for sender devices 106 and recipient devices 108, signature generation and verification algorithms, address generation algorithms, linked wallet pairs, sidechain data, etc.

Processing for Redundant Blockchain Transactions

Figure 3:
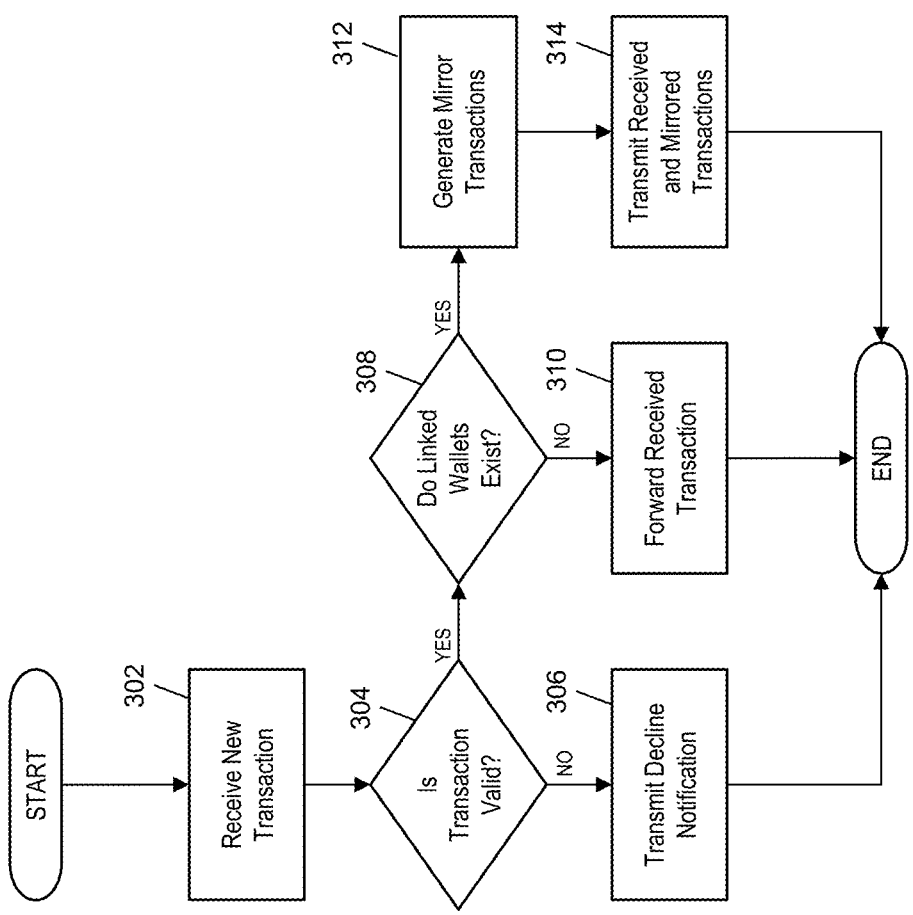
FIG. 3 is a flow diagram illustrating a process for processing redundant blockchain transactions executed by the processing server of FIG. 2 in accordance with exemplary embodiments.

FIG. 3 illustrates an example process executed by the processing server 102 of FIG. 2 for use in the system 100 of FIG. 1 for the processing of redundant blockchain transactions for linked blockchain wallets.

In step 302, the receiving device 202 of the processing server 102 may receive a new blockchain transaction from a sender device 106 or recipient device 108 using a suitable communication network and method. The new blockchain transaction may include at least an input transaction, digital signature, public key, recipient address, and transaction data. In step 304, the processing server 102 may first determine if the transaction is valid. This determination may be based on a check performed by the validation module 222 of the processing server 102 to determine if the sending blockchain wallet has authority to use the input transaction, such as based on a validation of the digital signature using a public key in the input transaction, and that the transaction data corresponds to data included in the input transaction, if applicable (e.g., for cryptographic currency transfer, the amount being transferred must be less than or equal to the amount provided in the input transactions).

If, in step 304, the processing server 102 determines that the transaction is not valid, then, in step 306, the transmitting device 224 of the processing server 102 may electronically transmit a notification to the sender device 106 or recipient device 108 informing that validation of the submitted transaction failed. In some cases, the sender or recipient may be provided with an opportunity to submit a revised blockchain transaction, where the process 300 may be repeated in an additional attempt at the transaction. If, in step 304, the processing server 102 determines that the transaction is valid, then, in step 308, the processing server 102 may check to see if the sending blockchain wallet or recipient blockchain wallet are linked wallets. The check may be based on a query (e.g., executed by the querying module 218 of the processing server 102) of the blockchain data 206 and/or memory 226 to identify if there is a blockchain wallet pair that includes the public key included in the new transaction or includes a public key used to generate the address in the new transaction. If neither blockchain wallet is a linked wallet, then, in step 310, the transmitting device 224 of the processing server 102 may electronically transmit the transaction to a node in the blockchain network 104 for inclusion in a new block that is generated, confirmed, and added to the blockchain.

If either of the wallets is a linked wallet, then, in step 312, the generation module 220 of the processing server may generate a plurality of mirror transactions, which includes generating a new blockchain data value for each redundant blockchain transaction. In cases where the sending blockchain wallet may be linked, a new blockchain data value may be generated for each linked sending blockchain wallet, where the new blockchain data value may include a public key for the linked wallet. In cases where the recipient blockchain wallet may be linked, a new blockchain data value may be generated for each linked recipient blockchain wallet, where the new blockchain data value may include a recipient address for the linked wallet, which may be generated by the generation module 220 using the public key of the linked wallet. In cases where both the sending blockchain wallet and recipient blockchain wallet may be linked, a new blockchain data value may be generated for every combination of wallets for both the sending and recipient linked wallets. In step 314, the transmitting device 224 of the processing server 102 may transmit the new blockchain data values to another node in the blockchain network 104, where the new blockchain data values may be exempt from confirmation by the node.

Exemplary Method for Processing Redundant Blockchain Transactions

Figure 4:
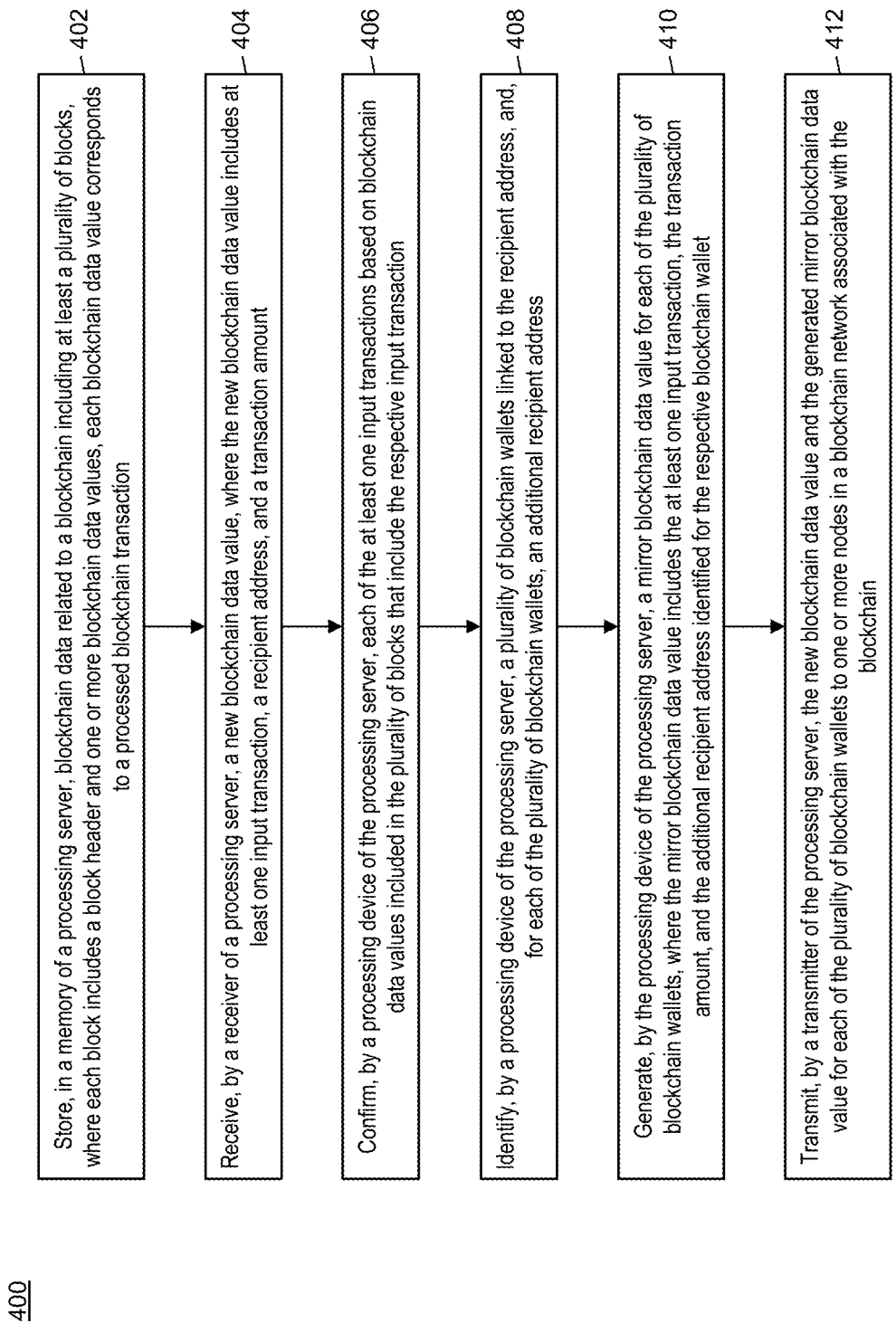
FIG. 4 is a flow chart illustrating an exemplary method for processing redundant blockchain transactions for linked wallets in accordance with exemplary embodiments.

FIG. 4 illustrates a method 400 for the processing of a blockchain transaction in a blockchain network including the processing of redundant blockchain transactions for linked blockchain wallets.

In step 402, blockchain data (e.g., blockchain data 206) may be stored in a memory (e.g., the memory 226) of a processing server (e.g., the processing server 102), wherein the blockchain data includes data related to a blockchain including at least a plurality of blocks, where each block includes a block header and one or more blockchain data values, each blockchain data value corresponds to a processed blockchain transaction. In step 404, a new blockchain data value may be received by a receiver (e.g., the receiving device 202) of the processing server, where the new blockchain data value includes at least one input transaction, a recipient address, and a transaction amount.

In step 406, each of the at least one input transactions may be confirmed by a processing device (e.g., the validation module 222) of the processing server based on blockchain data values included in the plurality of blocks that include the respective input transaction. In step 408, a plurality of blockchain wallets linked to the recipient address, and, for each of the plurality of blockchain wallets, an additional recipient address, may be identified by a processing device (e.g., the querying module 218) of the processing server.

In step 410, a mirror blockchain data value may be generated by the processing device (e.g., the generation module 220) of the processing server for each of the plurality of blockchain wallets, where the mirror blockchain data value includes the at least one input transaction, the transaction amount, and the additional recipient address identified for the respective blockchain wallet. In step 412, the new blockchain data value and the generated mirror blockchain data value for each of the plurality of blockchain wallets may be transmitted by a transmitter (e.g., the transmitting device 224) of the processing server to one or more nodes in a blockchain network (e.g., the blockchain network 104) associated with the blockchain.

In one embodiment, each of the mirror blockchain data values may not be confirmed. In some embodiments, the method 400 may also include: identifying, by the processing device of the processing server, a second set of blockchain wallets linked to the at least one input transaction; and repeating, by the processing device of the processing server, the generating step for each blockchain wallet in the second set of blockchain wallets where the at least one input transaction is associated with the respective blockchain wallet. In one embodiment, the method 400 may further include validating, by the processing device of the processing server, a digital signature using a public key of a cryptographic key pair, wherein the digital signature and public key are received with the new blockchain data value.

In some embodiments, the plurality of blockchain wallets linked to the recipient address may be identified in a sidechain to the blockchain. In one embodiment, the method 400 may also include storing, in a memory of the processing server, a plurality of wallet pairs, where each wallet pair includes one of the plurality of blockchain wallets and an additional wallet associated with the recipient address. In some embodiments, the plurality of blockchain wallets linked to the recipient address may be identified in an electronic transmission accompanying the new blockchain data value. In a further embodiment, the electronic transmission may further include, for each of the plurality of blockchain wallets, a digital signature and a public key of a cryptographic key pair, and the method 400 may even further include validating, by the processing device of the processing server, the digital signature for each of the plurality of blockchain wallets using the respective public key.

Computer System Architecture

Figure 5:
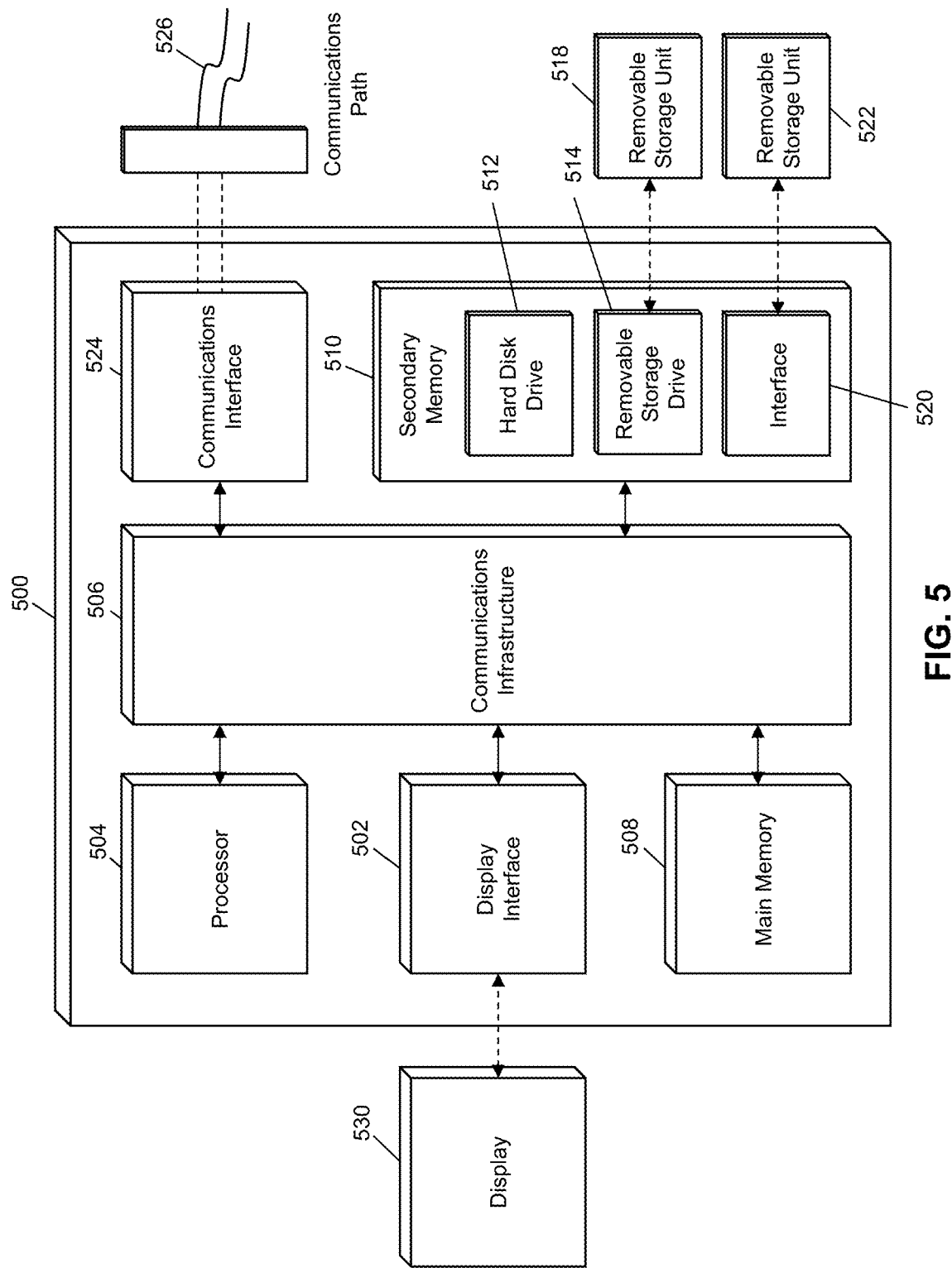
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for processing redundant blockchain transactions for linked wallets. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing redundant blockchain transactions for linked wallets, comprising:

storing, in a memory of a processing server, blockchain data related to a blockchain including at least a plurality of blocks, where each block includes a block header and one or more blockchain data values, each blockchain data value corresponds to a processed blockchain transaction;

receiving, by a receiver of the processing server, a new blockchain data value for a new blockchain transaction, where the new blockchain data value includes at least one unspent transaction output, a recipient address, and a transaction amount;

confirming, by a processing device of the processing server, each of the at least one input transaction based on blockchain data values included in the plurality of blocks that include the respective input transaction;

storing, in the memory of the processing server, a sidechain separate from the blockchain but accessible by nodes in the blockchain via a two-way connection, the sidechain including a one or more blockchain wallets linked to the recipient address, each of the one or more blockchain wallets linked to the recipient address having a separate address that is different from the recipient address, wherein the sidechain stores one or more linkage transactions between each of the one or more blockchain wallets and the linked recipient address, the one or more linkage transactions each being a redundant blockchain transaction of a blockchain transaction conducted in the blockchain by the recipient address;

identifying, by a processing device of the processing server, one or more blockchain wallets linked to the recipient address in the sidechain;

identifying, for each blockchain wallet of the one or more blockchain wallets linked to the recipient address, the separate address associated therewith;

generating, by the processing device of the processing server, a mirror blockchain data value for each of the one or more blockchain wallets linked to the recipient address, where each of the mirror blockchain data values is a redundant blockchain transaction of the new blockchain transaction, and wherein each mirror blockchain data value includes the at least one an unspent transaction output, the transaction amount, and the separate address identified for the respective blockchain wallet, wherein each of the mirror blockchain data values further includes an indication signaling to a blockchain node to refrain from confirming the corresponding mirror blockchain data value; and transmitting, by a transmitter of the processing server, the new transaction and the generated redundant transaction for each of the one or more blockchain wallets to one or more nodes in a blockchain network associated with the blockchain.

2. The method of claim 1, wherein the indication to refrain from attempting to confirm a corresponding mirror blockchain data value of each of the mirror blockchain data values comprises a flag configured to indicate, to the one or more nodes in the blockchain network associated with the blockchain, that the corresponding mirror blockchain data value is a redundant blockchain data value.

3. The method of claim 2, wherein at least one of the mirror blockchain data values further includes an identification value configured to link the corresponding redundant blockchain data value to the new blockchain data value.

4. The method of claim 1, further comprising:
identifying, by the processing device of the processing server, a second set of blockchain wallets linked to the at least one unspent transaction output; and
repeating, by the processing device of the processing server, the generating step for each blockchain wallet in the second set of blockchain wallets where the at least one unspent transaction output is associated with the respective blockchain wallet.

5. The method of claim 1, further comprising:
validating, by the processing device of the processing server, a digital signature using a public key of a cryptographic key pair, wherein the digital signature and public key are received with the new blockchain data value.

6. The method of claim 1, further comprising:
storing, in a memory of the processing server, a plurality of wallet pairs, where each wallet pair includes one of the plurality of blockchain wallets and an additional wallet associated with the recipient address.

7. The method of claim 1, wherein the plurality of blockchain wallets linked to the recipient address are identified in an electronic transmission accompanying the new blockchain data value.

8. The method of claim 7, wherein
the electronic transmission further includes, for each of the plurality of blockchain wallets, a digital signature and a public key of a cryptographic key pair, and
the method further comprises:
validating, by the processing device of the processing server, the digital signature for each of the plurality of blockchain wallets using the respective public key.

9. The method of claim 1, wherein at least one of the mirror blockchain data values further includes an identification value configured to link the corresponding mirror blockchain data value to the new blockchain data value.

10. A system for processing redundant blockchain transactions for linked wallets, comprising:
a memory of a processing server configured to:
store blockchain data related to a blockchain including at least a plurality of blocks, where each block includes a block header and one or more blockchain data values, each blockchain data value corresponds to a processed blockchain transaction, and
store a sidechain separate from the blockchain but accessible by nodes in the blockchain via a two-way connection, the sidechain including a one or more blockchain wallets linked to the recipient address, each of the one or more blockchain wallets linked to the recipient address having a separate address that is different from the recipient address, wherein the sidechain stores one or more linkage transactions between each of the one or more blockchain wallets and the linked recipient address, the one or more linkage transactions each being a redundant blockchain transaction of a blockchain transaction conducted in the blockchain by the recipient address;
a receiver of the processing server configured to receive a new blockchain data value for a new blockchain transaction, where the new blockchain data value includes at least one unspent transaction output, a recipient address, and a transaction amount;
a processing device of the processing server configured to
confirm each of the at least one input transaction based on blockchain data values included in the plurality of blocks that include the respective input transaction,
identify, in a sidechain, one or more blockchain wallets linked to the recipient address in the sidechain,
identify, for each blockchain wallet of the one or more blockchain wallets linked to the recipient address, the separate address associated therewith, and
generate a mirror blockchain data value for each of the one or more blockchain wallets linked to the recipient address, where each of the mirror blockchain data values is a redundant blockchain transaction of the new blockchain transaction, and wherein each mirror blockchain data value includes the at least one an unspent transaction output, the transaction amount, and the separate address identified for the respective blockchain wallet, wherein each of the mirror blockchain data values further includes an indication signaling to a blockchain node to refrain from confirming the corresponding mirror blockchain data value; and
a transmitter of the processing server configured to transmit the new transaction and the generated redundant transaction for each of the one or more blockchain wallets to one or more nodes in a blockchain network associated with the blockchain.

11. The system of claim 10, wherein the indication to refrain from attempting to confirm a corresponding mirror blockchain data value of each of the mirror blockchain data values comprises a flag configured to indicate, to the one or more nodes in the blockchain network associated with the blockchain, that the corresponding mirror blockchain data value is a redundant blockchain data value.

12. The system of claim 11, wherein at least one of the mirror blockchain data values further includes an identification value configured to link the corresponding redundant blockchain data value to the new blockchain data value.

13. The system of claim 10, wherein the processing device of the processing server is further configured to
identify a second set of blockchain wallets linked to the at least one unspent transaction output, and
repeat the generating step for each blockchain wallet in the second set of blockchain wallets where the at least one unspent transaction output is associated with the respective blockchain wallet.

14. The system of claim 10, wherein the processing device of the processing server is further configured to validate a digital signature using a public key of a cryptographic key pair, wherein the digital signature and public key are received with the new blockchain data value.

15. The system of claim 10, further comprising:
a memory of the processing server configured to store a plurality of wallet pairs, where each wallet pair includes one of the plurality of blockchain wallets and an additional wallet associated with the recipient address.

16. The system of claim 10, wherein
the plurality of blockchain wallets linked to the recipient address are identified in an electronic transmission accompanying the new blockchain data value.

17. The system of claim 16, wherein
the electronic transmission further includes, for each of the plurality of blockchain wallets, a digital signature and a public key of a cryptographic key pair, and
the processing device of the processing server is further configured to validate the digital signature for each of the plurality of blockchain wallets using the respective public key.

18. The system of claim 10, wherein at least one of the mirror blockchain data values further includes an identification value configured to link the corresponding mirror blockchain data value to the new blockchain data value.

\* \* \* \* \*